United States Patent [19]

Waldron

[11] Patent Number: 4,867,514

[45] Date of Patent: Sep. 19, 1989

[54] SYSTEMS FOR DEVIATING AND (OPTIONALLY) CONVERGING RADIATION

[75] Inventor: Robert D. Waldron, Hacienda Heights, Calif.

[73] Assignee: Hydro Fuels, Inc., Wilmington, Del.

[21] Appl. No.: 796,957

[22] Filed: Nov. 12, 1985

[51] Int. Cl.⁴ .......................... G02B 5/22; G02B 27/00; G02B 3/00; F24J 2/08

[52] U.S. Cl. .................................... 350/1.1; 350/167; 350/453; 126/440

[58] Field of Search .................. 350/167, 1.1, 453; 126/440

[56] References Cited

U.S. PATENT DOCUMENTS

| | | | |
|---|---|---|---|
| 1,678,711 | 7/1928 | Shipman | 126/440 X |
| 3,002,051 | 9/1961 | Tait | 350/453 X |
| 3,988,066 | 10/1976 | Suzuki et al. | 350/167 X |
| 4,050,789 | 9/1977 | Herbert | 126/440 X |
| 4,456,783 | 6/1984 | Baker | 350/167 X |

FOREIGN PATENT DOCUMENTS 21456 of 1909 United Kingdom ................ 350/167

Primary Examiner—John K. Corbin
Assistant Examiner—David J. Edmondson
Attorney, Agent, or Firm—Bright & Lorig

[57] ABSTRACT

Such system can include, in the first plane, a first optical device for producing converging radiation from incident, substantially parallel radiation passing through the first optical device and, in a second plane, substantially parallel to the first plane, a second optical device for receiving, as incident radiation, converging radiation from the first optical device and for recollimating or reducing the degree of convergence of this incident, converging radiation as it passes through the second optical device.

17 Claims, 5 Drawing Sheets

SYSTEMS FOR DEVIATING AND (OPTIONALLY) CONVERGING RADIATION

This invention relates to systems and methods for deviating or changing the direction of, and optionally converging radiation such as solar radiation. These systems and methods facilitate the concentration of radiation, particularly solar radiation, incident on such systems.

In one embodiment, the new systems for deviating (and optionally converging) radiation comprise, in a first plane, first optical means for producing converging radiation from incident, substantially parallel (i.e., collimated) radiation passing through the first optical means. These systems also include, in a second plane, substantially parallel to the first plane, second optical means for receiving, as incident radiation, converging radiation from the first optical means and for recollimating or reducing the degree of convergence of the incident, converging radiation as it passes through the second optical means. In this embodiment, the first and second optical means have substantially coincident focal zones (points or lines), and at least one of the first and second optical means is movable to maintain substantial coincidence of their focal zones as the angle of incidence of radiation on the system changes.

This first embodiment can also cause radiation incident on the opposite side of these systems to divert into a discrete number of multiple beams traveling in different directions where the radiation first passes through the second optical means, and then passes through the first optical means.

In this first embodiment, the optical means in the first plane can be a plurality of simple cylindric lenses in edge-to-edge array, a plurality of quasi-spherical lenses, a plurality of simple spherical lenses, a plurality of aspheric lenses, or a plurality of spherical lenses having two convex surfaces. The optical means in the first plane can, depending on which lenses are used, produce singly-converging or multiply-converging radiation from incident, substantially parallel radiation passing through the first optical means.

The optical means in the second plane of this first embodiment can be a plurality of simple negative lenses in substantially edge-to-edge array. The second optical means can, for example, also be a plurality of interrupted wavefront negative lenses or aspheric negative lenses.

The ratio of the focal length of the first optical means to the focal length of the second optical means can vary. As the ratio of the focal length of the first optical means to the focal length of the second optical means increases, the angular dispersion of radiation beam intensity, and the ratio of dark to illuminated zones, after passing through the second optical means, increases in direct proportion. Preferably, the ratio of the focal length of the first optical means to the focal length of the second optical means should approximate the value at which the mean angular image width of radiation at the first focal zone is about equal to the mean angular width of aberrations produced by the first optical means. Alternatively, the focal length of the first optical means should be substantially equal to the value at which the mean image angular width of radiation at the focal zone of the first optical means is approximately the same as the angular width of aberrations produced by the first optical means.

Incident radiation on any single lens or array of lenses may be characterized by the angular size and shape of the radiation source at the plane of incidence. The angular size and shape, in turn, can be defined in terms of angular width and height with respect to any selected reference axes in the apparent plane of the radiation source.

A positive cylindric lens or array of lenses produces convergence of incident radiation only along a direction perpendicular to the meridian axes of the cylindrical lenses, and does not affect the elevation of incident radiation or of radiation emerging from such lenses above or below a plane perpendicular to the meridian axes of the first optical means. As such, a positve cylindric lens or array of lenses produces a narrow line image parallel to the lens axes from both a small angular diameter circular source, and from a long, narrow source, if the long axis of the narrow source is aligned with the meridian axes of the lenses. A positive spherical lens or array of lenses, however, produces convergence in both lateral and vertical planes with an angular width about the same as the angular width of the incident radiation.

The embodiments of this invention provide controlled deviation of the mean angle of incident radiation in at least one perpendicular plane. To perform satisfactorily, these embodiments should produce an image having a linear perpendicular width that is substantially smaller than the lateral width of a lens element (see FIG. 1). In other words, the lateral angular image width, expressed in radians, produced by these embodiments should be less than s/f or 1/F where f is the lens focal length and "F" is the lens "F" number. In practice, the "F" number is at least about 3, so that the lateral angular image width of radiation emerging from the system is much less than about 19°. These embodiments perform efficiently where the angular image width is about 5° or less. For solar imaging devices, the angular width of the sun is about 0.5° which would permit an "F" number of up to about 25, although higher values increase angular spreading of the radiation emerging from the system.

The first embodiments of this invention can be used at any wavelength for which suitable optical transmission and refraction can be obtained. Preferably, most of the incident radiation should have a wavelength in the range of about 0.3 to about 14 microns, or, alternatively, from about 100 to about 10,000 microns, i.e., for microwave beams.

In one form of this first embodiment, the system comprises, in a first plane, a plurality of positive, cylindric lenses in substantially edge-to-edge array, with each of the positive cylindric lenses having a focal length to width ratio of about 3:1 to about 12:1, and a width in the range of about 0.125 inch to about 3 inches; and, in a second plane, substantially parallel with the first plane, a plurality of negative, cylindric lenses in substantially edge-to-edge array. Each of the negative lenses has a focal length of about 10% to about 40% of the focal length of the positive lenses in the first plane, and a width ranging up to about 110% of the width of the positive lenses in the first plane. With this form of the first embodiment, for radiation having its source at infinity (or virtual infinity), the focal zones of each of the positive lenses in the first plane substantially coincide with the focal zones of corresponding negative lenses in the second plane, and at least one of the lens planes is movable to maintain this substantial coincidence for radiation incident on the system and having a transverse angular beam width of up to about 5°.

Where the first optical means is a plurality of positive lenses in edge-to-edge array, and the second optical means is a plurality of negative lenses in substantially edge-to-edge array, the ratio of the focal length of the lenses in first optical means to the width of these lenses is preferably in the range of about 3 to about 5. Moreover, the ratio of the focal length of the lenses in the second optical means to the width of the lenses in the second optical means is preferably sufficiently small to transmit incident radiation at the maximum required angular deviation from the optical axis of the first optical means, and preferably are in the range of about 0.3 to about 1. Preferably, this ratio decreases as the maximum required angular deviation from the optical axis of the first optical means increases.

In this form of the first embodiment, preferably, each of the plurality of negative cylindric lenses has substantially the same width as each of the positive cylindric lenses. More preferably, the distance from one lens centerline (or axis) to the centerline (or axis) of a contiguous lens is preferably the same or about the same within each group of contiguous lenses in the first plane, and is the same or about the same for each corresponding group of contiguous lenses in the second plane. Moreover, the plurality of negative lenses is preferably movable laterally in the second plane, and is movable toward and away from the first plane. Alternatively, the plurality of positive lenses in the first plane may be movable laterally, and movable toward and away from the second plane, to maintain substantial coincidence of the focal zones of each of the lenses in the two planes.

This form of the first embodiment can be modified to concentrate, as well as to deviate radiation incident on the system. To this end, the width (or distance from one lens axis or centerline to the axis or centerline of a contiguous lens) of each of the negative, cylindric lenses should be somewhat larger than the width of the positive, cylindric lenses in the first plane. Preferably, the width of each of the negative cylindric lenses is expressed by the quantity Ns divided by N−1, where N is the number of contiguous positive cylindric lenses in the first plane which are chosen to provide radiant energy to a common concentration zone, and s is the width of each of these positive cylindric lenses.

Both of these forms of the first embodiment can also be combined with a non-radiation-deviating means, or uniform radiation-deviating means through which radiation passes before becoming incident on the system. One such means is a glazing panel having optical absorption or fluorescent properties to absorb, or otherwise eliminate, most of the short wavelength (UV) radiation which would otherwise fall upon, and adversely affect the system. Additionally, or alternatively, the system can also be combined with means for removing radiation of longer wavelengths from incident radiation to minimize internal heating in the system.

With the modified form of the first embodiment that functions to both deviate and concentrate radiation incident on the system, the location of image zones for radiation emerging from the system depends on the angle of incidence of radiation on the first optical means and the relative lateral displacement between the first and second optical means. Absent any relative movement between the first and second optical means, the image of radiation emerging from the system shifts substantially for small changes in the angle of incidence.

For efficient collection of convergent, concentrated radiation from the system, lateral displacement of the second optical means should be limited to less than about half the linear distance between adjacent elements in the second optical means.

To operate in both lateral directions, the first optical means should take the form of a two-dimensional, periodic lattice of circular or hexagonal lenses with a corresponding, enlarged lattice arrangement for the elements in the second optical means. The ratios of axial lattice spacings between the first and second optical means need not be identical for x and y axes. If the x to y ratio of elements in the first optical means is not identical to the corresponding ratio in the second optical means, the system will produce stigmatic line images in different planes and with different spacings.

This invention can better be understood by reference to the drawings, in which.

Figure 1:
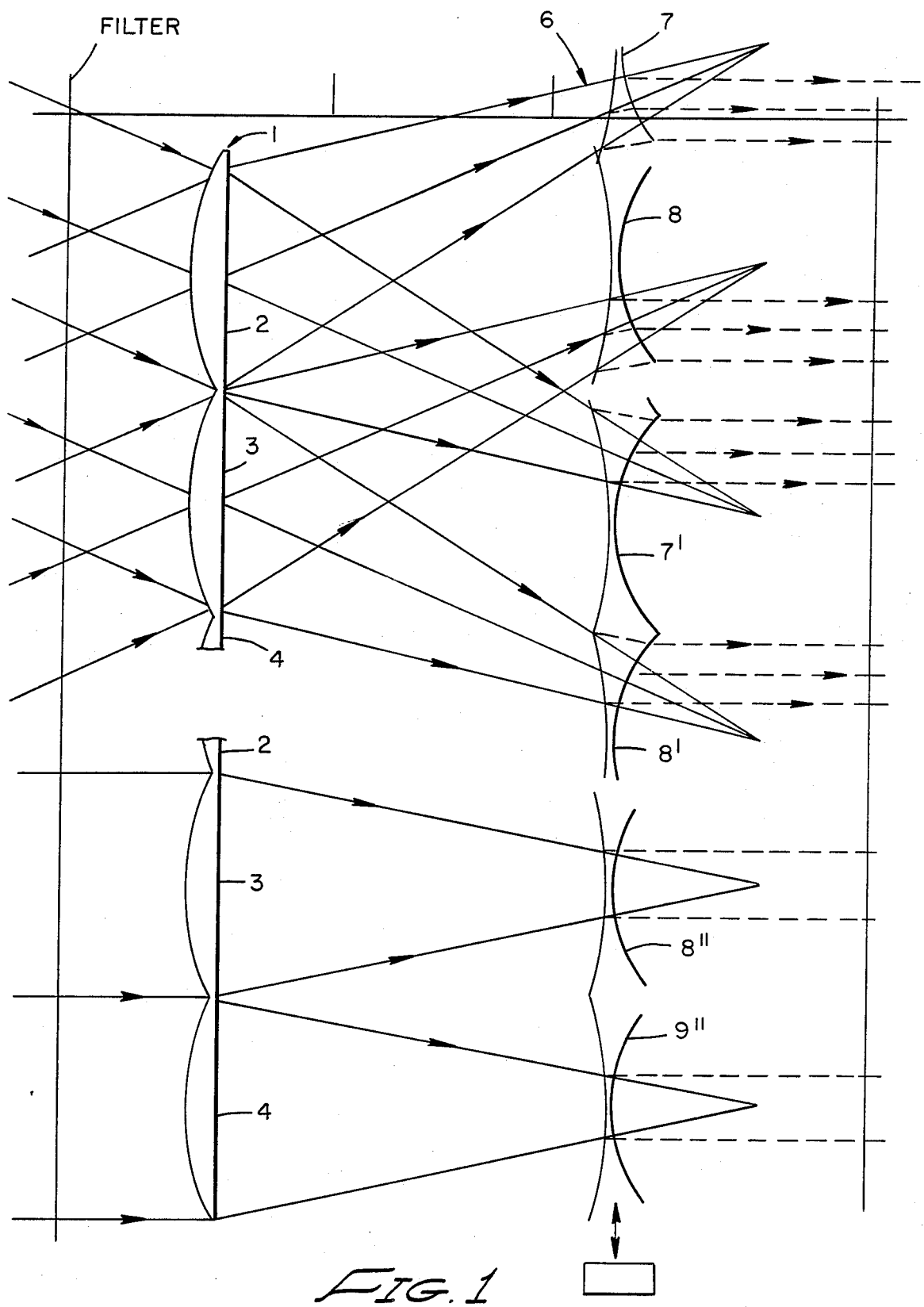
FIG. 1 shows one form of the first embodiment of this invention.

FIG. 1 shows one form of the first embodiment of this invention comprising, in a first plane generally designated 1, a plurality of positive cylindric lenses 2, 3 and 4 joined to one another in substantially edge-to-edge array. In a second plane, generally designated 6, a plurality of negative, cylindric lenses 7, 8 and 9 are joined to one another in substantially edge-to-edge array. All of the positive lenses in plane 1 have equal focal lengths, and the lens plane is so positioned that the focal points are substantially coincident with the focal points of the corresponding negative lenses in second plane 6. The lenses in the second plane 6 are movable laterally, and toward and away from the lenses in first plane 1, to maintain substantial coincidence of the focal points of the lenses in plane 1 with the corresponding lenses in plane 6.

In operation, the focal points of positive lenses 2, 3 and 4 are made to coincide with the focal points of negative lenses, 7, 8 and 9, respectively. As a radiation source such as the sun moves angularly with respect to the first lens plane, the second lens plane is moved so that lenses 7, 8 and 9 move through positions 7″, 8″ and 9″ toward 7′, 8′ and 9′.

Figure 3:
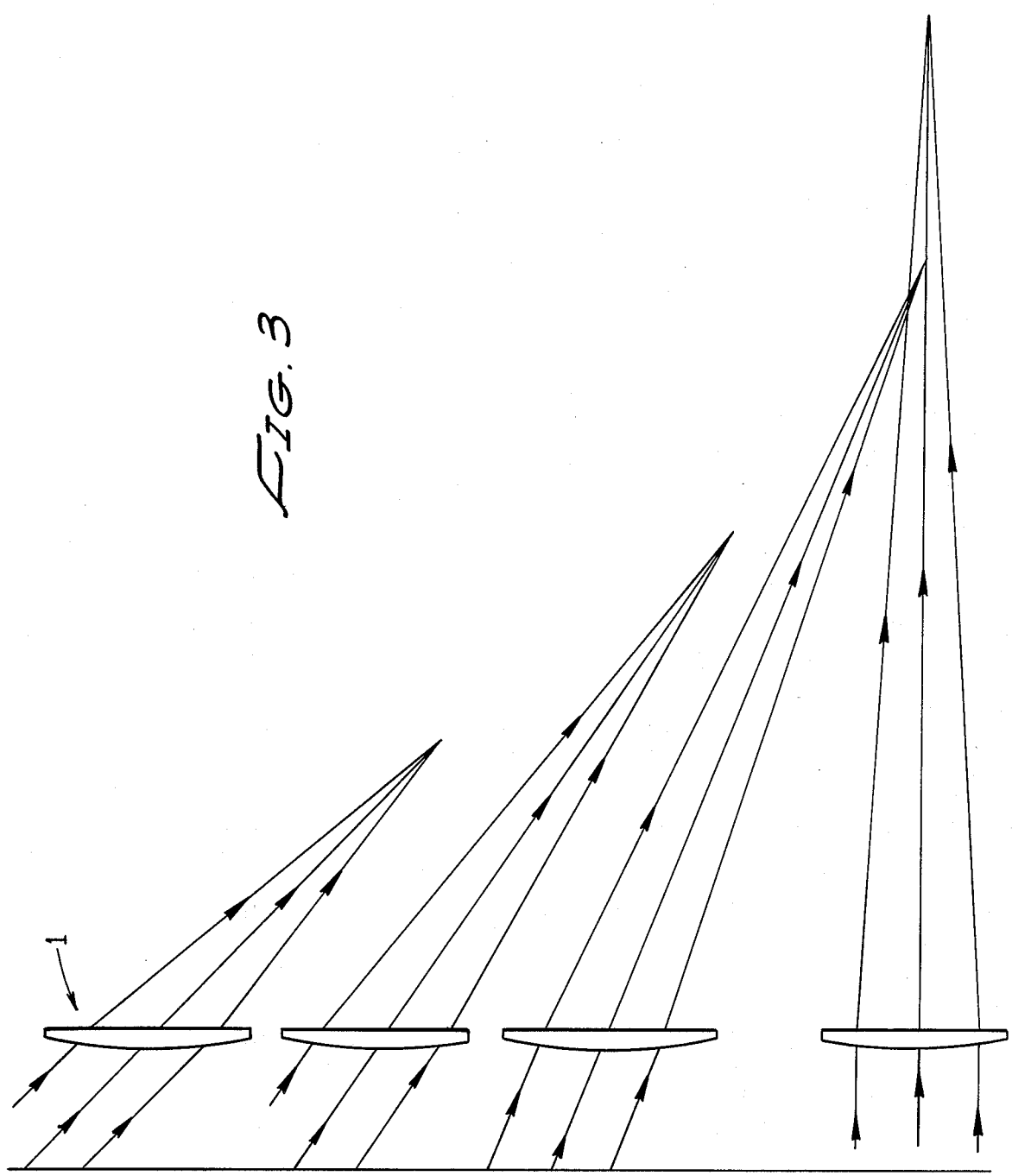
FIG. 3 shows how the first optical means of the system illustrated in FIG. 1 acts upon incident radiation to change the location of the focal points as the angle of incidence changes.

FIG. 3 shows that, as the angle of incidence of radiation on the positive cylindric lenses shifts from the meridian plane of the lenses, the perpendicular distance of the virtual or real line images produced by each of these lenses moves closer to plane 1. As this happens, the spacing between planes 1 and 6 should be reduced, and their relative lateral positions adjusted to maintain substantial coincidence between the virtual focal zones of the positive cylindric lenses in plane 1 and the negative cylindric lenses in plane 6.

The range of angular error for radiation emerging from the system depends on manufacturing and positioning tolerances and distortions in the lenses caused by gravity, thermal expansion of the lenses, and other structural stresses in the lenses. The sensitivity to absolute positioning errors of the first and second optical means can be reduced by increasing the width of the lenses and their focal lengths, but this requires larger and thicker lenses and increases cost.

As FIG. 1 shows, control of the direction of deviation of radiation incident on the system is attained by controlling the precise displacement of the center line or midplane of each lens in plane 6 with respect to the virtual free image points or lines produced by the lenses in plane 1. The positions of these virtual free image points or lines depend on the centerline or optical axis positions of the lenses in plane 1, and the input angle of radiation incident on plane 1.

Radiation emerging from plane 6 appears as a series of light zones separated by dark zones. The radiant intensities in the light zones are greater than the corresponding zones in radiation incident on the system. The angular dispersion of the light zones is increased in direct proportion to the ratio of the focal length of the lenses in the first plane to the focal length of the lenses in the second plane. To concentrate energy emerging from the system, the beam widths can be reexpanded to produce a nearly continuous wavefront of energy by means of an additional optical element such as divergent-convergent lens array pairs.

Figure 4:
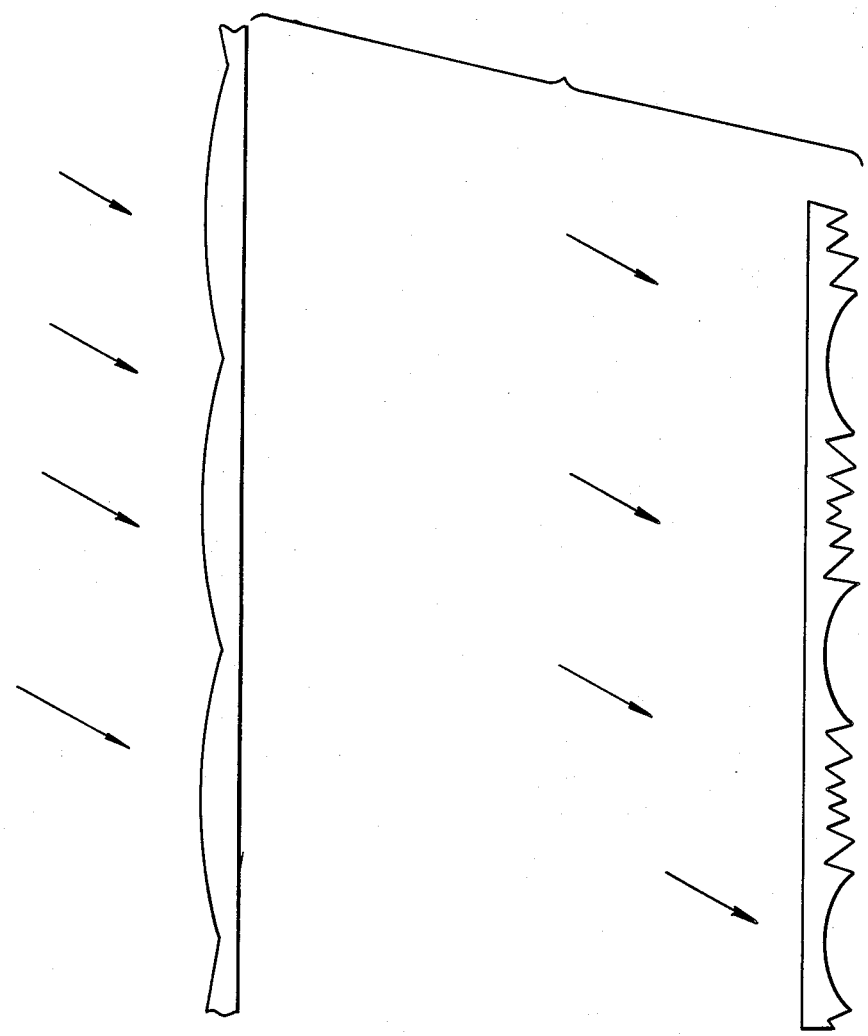
FIG. 4 shows alternate forms of both optical means in the first embodiment of this invention.

The system illustrated in FIGS. 1 and 4 can also be operated with energy incident first on the back side of plane 6. Energy incident on, and passing through the lenses in plane 6 undergoes divergence, and then undergoes convergence upon passing through the lenses in plane 1. The energy emerging from plane 1 comprises several sets of nearly collimated energy beams, each of lower intensity than the input beam, emerging at angles to the plane 1 whose tangents increase or decrease in nearly uniform intervals. The actual angles can be rapidly changed with small lateral displacements between planes 1 and 6, or alternatively, by changing the angle of incidence of the input radiation.

For operation as a convergent/divergent system, the form of the first embodiment shown in FIGS. 1 and 3 should operate with good transmission efficiency over a range of input angles of incidence. For small ranges, the positive cylindric lenses can be replaced with interrupted wavefront optical devices such as Fresnel lenses, but for ranges such as ±45° to, say, ±60°, the cylindric lenses shown in FIGS. 1 or 3, or quasi-spherical lenses for a two axis structure, are preferred.

To minimize optical aberrations, such as spherical and chromatic aberration, the elements in plane 1 can have a meniscus profile as shown in FIG. 4 and/or a non-uniform curvature, or both. Chromatic aberration can be minimized by using low dispersion, or high Abbe number optical materials, or by using a laminated or fused achromatic lens design consisting of a strongly convergent lens of high Abbe number attached to a weaker, negative lens of low Abbe number.

FIG. 4 shows alternative optical elements in plane 6, namely, interrupted wavefront (Fresnel) negative lenses. Spherical aberrations can be minimized by using optical elements of non-uniform curvature. Use of low Abbe number materials can also partly compensate for chromatic aberrations.

Figure 5:
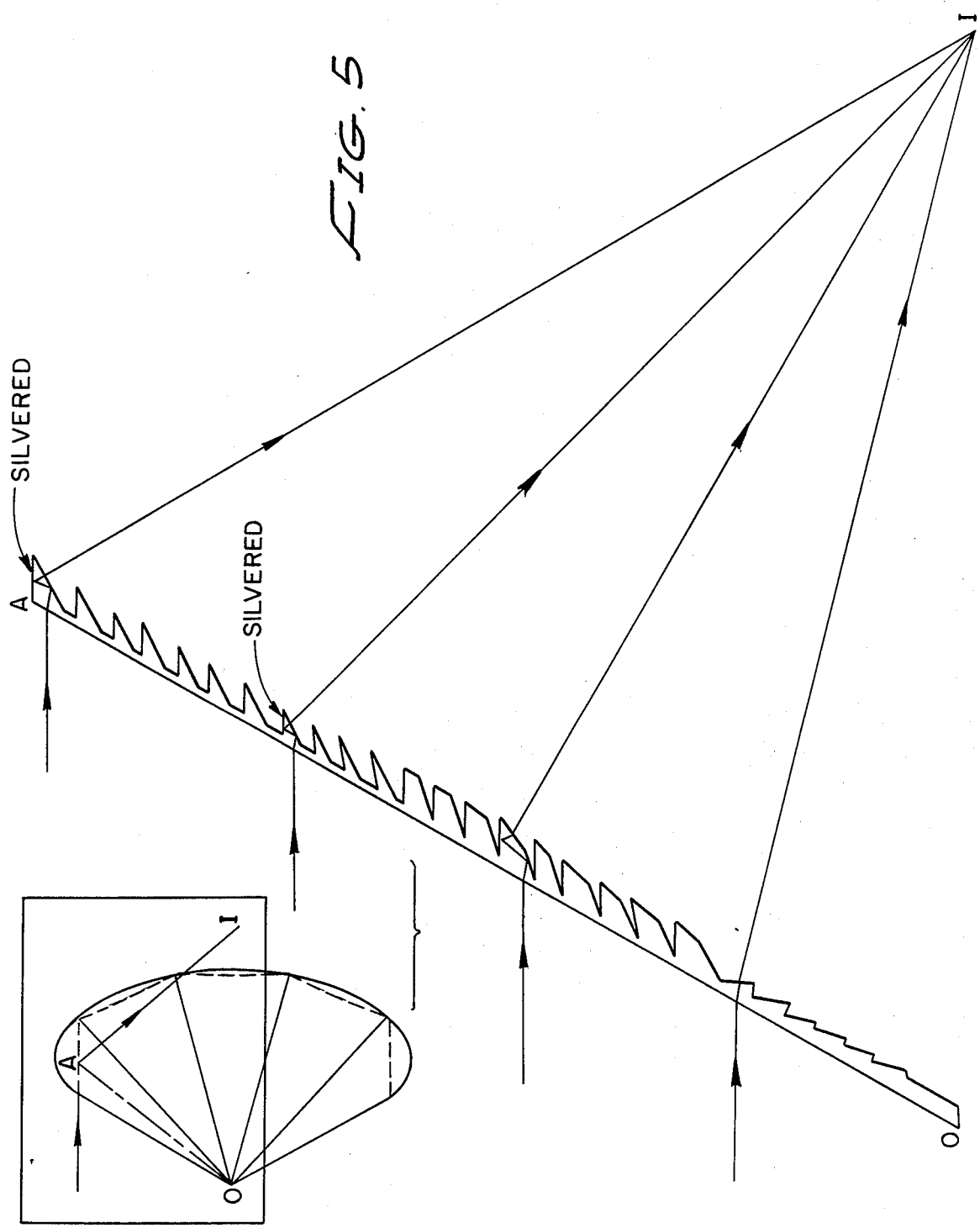
FIG. 5 shows a double-reflection pseudo lens of the sort that may be used in this invention.

An alternative design for the second optical means is an interrupted wavefront array of double reflection prisms which may be termed a double-reflection pseudo lens. This pseudo lens functions like a lens, as shown in FIG. 5, and eliminates chromatic aberration and beam angle sensitivity to surface angle error. The inset of FIG. 5 shows a perspective view of such a pseudo lens.

Figure 2:
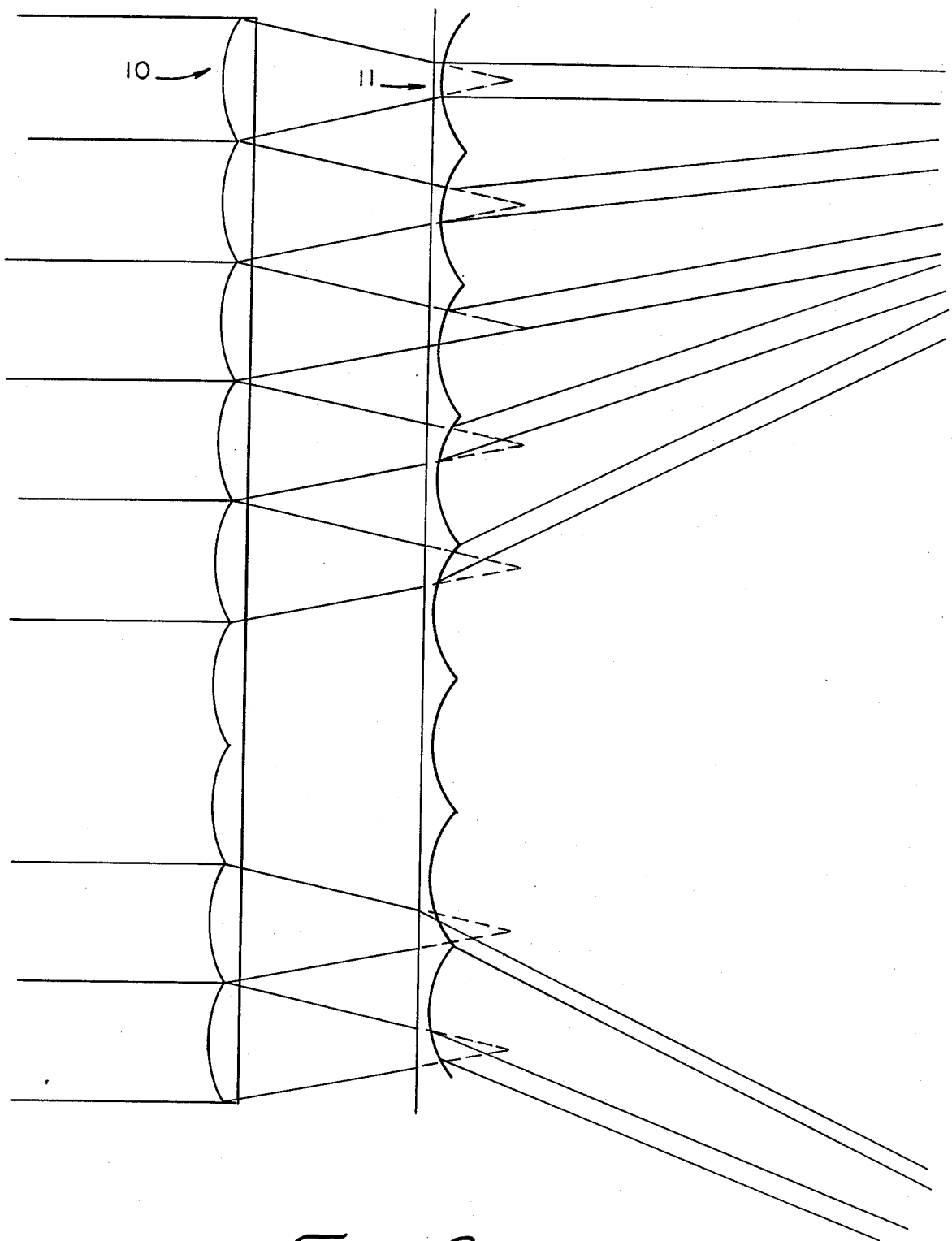
FIG. 2 shows a second form of the first embodiment of this invention.

FIG. 2 shows a second form of the first embodiment of the invention in which the number of elements in plane 10, corresponding to plane 1 in FIG. 1, is greater than the number of elements in plane 11, corresponding to plane 6 in FIG. 1. Radiation passing through the positive, cylindric elements in plane 10 and the negative, cylindric elements in plane 11 are

What is claimed is:

1. A system for controlled deviation of radiation comprising: in a first plane, a plurality of positive, cylindric lenses in substantially edge-to-edge array, each of said positive, cylindric lenses having a focal length to width ratio in the range of about 3 to 1 to about 12 to 1, and a width in the range of about 0.125 inch to about 3 inches; and in a second plane, substantially parallel with said first plane, a plurality of negative, cylindric lenses in substantially edge-to-edge array, each of said negative lenses having a focal length of about 10% to about 40% of the focal length of the positive cylindric lenses, and a width ranging up to about 110% of the width of the positive cylindric lenses; wherein, for radiation having its source at infinity (or virtual infinity), the focal zones of each of the positive lenses in said first plane substantially coincides with the focal zones of corresponding negative lenses in said second plane, and wherein at least one of said pluralities of lenses is movable to maintain said substantial coincidence for radiation incident on said system and having a transverse angular beam width of up to about 5° in a plane perpendicular to the axes of said lenses.

2. The system of claim 1 wherein each of said plurality of negative cylindric lenses has substantially the same width as each of said positive cylindric lenses.

3. The system of claim 1 wherein said plurality of negative lenses is movable laterally in said second plane, and is movable toward and away from said first plane.

4. The system of claim 1 wherein the width of each of said negative, cylindric lenses is expressed by the quantity Ns divided by N−1 where N is a predetermined number of contiguous positive cylindric lenses in said first plane and s is the width of each of said positive cylindric lenses.

5. The system of claim 4 wherein said plurality of negative lenses is movable laterally in said second plane, and is movable toward and away from said first plane.

6. A system for controlled deviation of radiation comprising: in a first plane, first optical means comprising a plurality of lens means for producing singly- or multiply-converging radiation from incident, substantially parallel radiation passing through said first optical means; and in a second plane, substantially parallel to said first plane, second optical means comprising a plurality of lens means for receiving, as incident radiation, said singly or multiply converging radiation and for reducing the degree of convergence of the incident, converging radiation passing through said second optical means, said first optical means and said second optical means having substantially coincident focal zones, and at least one of said first optical means and said second optical means being movable to maintain said substantial coincidence as the angle of incidence of radiation on said system changes.

7. The system of claim 6 wherein the angular dispersion of radiation, after passing through said second plane, increases in direct proportion to the ratio of the focal length of the first plane to the focal length of the second plane.

8. The system of claim 6 wherein the optical means in said first plane is a plurality of simple positive cylindric lenses in edge-to-edge array.

9. The system of claim 6 wherein the optical means in the first plane is a plurality of quasi-spherical positive lenses.

10. The system of claim 6 wherein the optical means in said first plane is a plurality of simple cylindric lenses, simple spherical lenses, aspheric lenses, spherical lenses having two convex surfaces, meniscus lenses or Fresnel lenses.

11. The system of claim 6 wherein the optical means in said second plane is a plurality of elements whose members are selected from the group consisting of simple negative lenses, interrupted wave front negative lenses, aspheric negative lenses and double reflection pseudo lenses.

12. The system of claim 6 further comprising means for filtering out or removing radiation having wavelengths in the range of about 0.2 micron to about 0.4 micron from radiation directed upon or toward said system.

13. The system of claim 6 wherein the focal length of said first optical means is substantially the same as the value at which the mean angular image width produced by said first optical means at the first focal zone is substantially the same as the mean angular width of aberrations produced by said first optical means at said first focal zone.

14. The system of claim 6 wherein radiation incident on said system has an angular beam width of not more than about 5°; wherein the incident radiation has a wavelength in the range of about 0.3 micron to about 14 microns or about 100 microns to about 10,000 microns; wherein said first optical means comprises a plurality of lenses and wherein said second optical means comprises a plurality of lenses; wherein the ratio of the focal length of the lenses in said first plane to the width of said lenses in said first plane is at least about 3 and not more than about 5; and wherein the ratio of the focal length of the lenses in said second plane to the width of the lenses in said second plane is in the range of about 0.5 to about 1.

15. A system for controlled deviation and concentration of radiation comprising: in a first plane, a plurality of positive, cylindric lenses in substantially edge-to-edge array, each of said positive, cylindric lenses having a focal length to width ratio in the range of about 3 to 1 to about 12 to 1, and a width in the range of about 0.125 inch to about 3 inches; and in a second plane, substantially parallel with said first plane, a plurality of negative, cylindric lenses in substantially edge-to-edge array, each of said negative lenses having a focal length of about 10% to about 40% of the focal length of the positive cylindric lenses, and a width ranging up to about 110% of the width of the positive cylindric lenses; wherein, for radiation having its source at infinity (or virtual infinity), the focal zones of each of the positive lenses in said first plane lie substantially in the same plane with the focal zones of corresponding negative lenses in said second plane, and wherein the width and spacing of said negative cylindric lenses is expressed as the quantity Ns divided by $N-1$ where N is a predetermined number of contiguous positive cylindric lenses in said first plane and s is the width or spacing of said positive cylindric lenses, and at least one of said pluralities of lenses is movable to maintain said substantially planar coincidence for radiation incident on said system and having a transverse angular beam width of up to about 5° in a plane perpendicular to the axes of said lenses.

16. The system of claim 15 wherein said plurality of negative lenses is movable laterally in said second plane, and is movable toward and away from said first plane.

17. A system for concentrating and deviating radiation comprising: in a first plane, first optical means for producing singly- or multiply-converging radiation from incident, substantially parallel radiation passing through said first optical means; and in a second plane, substantially parallel to said first plane, second optical means for receiving, as incident radiation, said singly or multiply converging radiation and for reducing the degree of convergence of the incident, converging radiation passing through said second optical means, said first optical means and said second optical means having focal zones lying in substantially the same plane, and at least one of said first optical means and said second optical means being movable to maintain said substantial coincidence as the angle of incidence of radiation on said system changes.

* * * * *